United States Patent [19]
Yoshida

[11] 3,936,675
[45] Feb. 3, 1976

[54] REFERENCE POINT POTENTIAL COMPENSATING CIRCUIT FOR USE WITH PHASE CONTROLLER

[75] Inventor: Tetsuo Yoshida, Tokyo, Japan

[73] Assignee: Fuji Xerox Co., Ltd., Tokyo, Japan

[22] Filed: Dec. 26, 1973

[21] Appl. No.: 428,015

[30] Foreign Application Priority Data
Dec. 29, 1972  Japan................................ 48-3722

[52] U.S. Cl......... 307/252 F; 307/252 W; 307/262; 307/295; 307/297; 328/155; 323/34
[51] Int. Cl....... H03k 17/00; H03k 1/12; G05f 3/00
[58] Field of Search........ 307/262, 297, 252 F, 308, 307/310, 295; 328/155, 156, 158; 323/34

[56] References Cited
UNITED STATES PATENTS

| | | | |
|---|---|---|---|
| 3,337,792 | 8/1967 | Engelson.......................... | 307/262 X |
| 3,386,037 | 5/1968 | Yamada............................ | 307/262 X |
| 3,612,917 | 10/1971 | Sutcliffe............................. | 307/297 |
| 3,684,919 | 8/1972 | Cramer............................. | 307/252 F |
| 3,735,242 | 5/1973 | Andersen......................... | 307/297 X |
| 3,800,167 | 3/1974 | Smith................................ | 307/262 X |

Primary Examiner—Stanley D. Miller, Jr.
Attorney, Agent, or Firm—Gerald J. Ferguson, Jr.; Joseph J. Baker

[57] ABSTRACT

Reference point potential compensating circuitry for controlling phase control circuitry which regulates the value of a predetermined parameter, the compensating circuitry comprising means for generating a first signal which varies periodically with time; means, responsive to the first signals, for generating a second signal which periodically increases in amplitude with respect to time; means for generating a third signal, the amplitude of which is a function of the predetermined parameter; means for adding the second and third signals to develop a fourth signal; means, responsive to the first signal, for generating a fifth signal, the amplitude of which is a function of the frequency of the first signal; means for comparing the fourth and fifth signals to generate a sixth signal, the sixth signal being applied to the phase control circuitry to render the operation of the phase control circuitry independent of frequency or amplitude variations of the first signal.

4 Claims, 4 Drawing Figures

(1-a)

(1-b)

(2-a)

$V_p$ : REFERENCE POTENTIAL AT 60 Hz
$V_p'$ : REFERENCE POTENTIAL AT 50 Hz
$\alpha 60$ : PHASE ANGLE AT 60 Hz
$\alpha 50$ : PHASE ANGLE AT 50 Hz
(NO COMPENSATION)
$\alpha 50'$ : PHASE ANGLE AT 50 Hz
(COMPENSATED)
$T50$ : PERIOD AT 50 Hz
$T60$ : PERIOD AT 60 Hz $$\frac{\alpha 60}{T60} \neq \frac{\alpha 50}{T50} \quad \text{NO COMPENSATION}$$

$$\frac{\alpha 60}{T60} = \frac{\alpha 50'}{T50} \quad \text{COMPENSATION}$$

3,936,675

REFERENCE POINT POTENTIAL COMPENSATING CIRCUIT FOR USE WITH PHASE CONTROLLER

BACKGROUND OF THE INVENTION

1. Field of the Invention

This invention relates to a reference point potential compensating circuit for use in phase controllers, and especially to a compensating circuit in which the reference point potential of a turn-on element is varied in response to fluctuation in power supply frequency and/or power supply voltage, so that the phase-controlled wave form is not affected by the fluctuations in the power supply.

2. Discussion of the Prior Art

In controlling a load by phase control, for example, in phase control type temperature adjusters, a cosine wave form (See FIG. 1-a) or saw-tooth wave form Vc obtained from an a-c power supply by an integration circuit is superposed on a control voltage Vd representing the temperature of the load. The resulting wave form is compared with a constant voltage Vp and a pulse is produced at a coinciding point A to obtain a load voltage having wave form $V_L$ shown in FIG. 1-b. Many phase control circuits are known for switching a signal to a load to obtain a load voltage signal as in FIG. 1-b. These phase control circuits typically include a thyratron-type element which, in response to the before-mentioned pulse, switches a control signal at some selected phase angle thereof across the load to be regulated. The phase angle determines the amount of voltage applied to the load. Referring to FIG. 1, point A is moved with any amplitude change of control voltage Vd, which, in turn is caused by temperature change. Thus, the load voltage $V_L$ can be controlled. If the circuit is designed for a 60 Hz a-c power supply and if it is desirable to connect it to a 50 Hz a-c, the cosine wave form changes from the solid line to the broken line of FIG. 2-a due to a difference in integration action, and as a result, the phase control wave form varies as shown in FIG. 2-b. That is, since the period $T_{60}$ in 60 Hz is smaller than the period $T_{50}$ in 50 Hz, the maximum voltage of $Vc_{60}$ is smaller than the maximum voltage of $Vc_{50}$, establishing a relation.

$$\frac{\alpha_{60}}{T_{60}} \neq \frac{\alpha_{50}}{T_{50}}$$

Thus, 50 Hz as compared to 60 Hz gives a greater effective value of phase control voltage for the control voltage Vd. Hence in temperature adjusters, the device cannot be used with both 50 and 60 Hz power sources.

Also when the power supply voltage fluctuates, a fixed reference point voltage results in a similar inconvenience. When the power supply voltage increases, the point A shifts to A' increasing the turn-on angle, and the load voltage increases markedly with this increase in voltage. In order to maintain the load voltage constant, the turn-on angle should be narrowed.

SUMMARY OF THE INVENTION

In order to eliminate the above-mentioned drawbacks, this invention provides means for varying the reference voltage Vp automatically depending on the variation in power supply frequency so that the turn-on angle of the load voltage $V_L$ is maintained constant and independent of variation in frequency. The invention also automatically varies the reference voltage $V_p$ when the power supply voltage fluctuates, to also compensate for this effect.

Other objects of the invention will be apparent from a reading of the following specification and claims.

DETAILED DESCRIPTION OF PREFERRED EMBODIMENT

Figure 2:
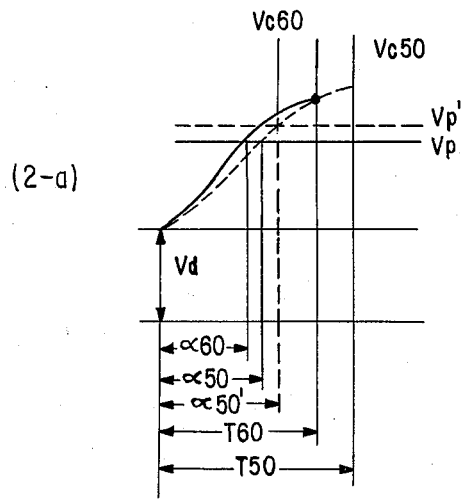
FIGS. 2-a and b are diagrams similar to FIG. 1, but shows the effect on the output voltage of power supply frequency variation.
Figure 3:
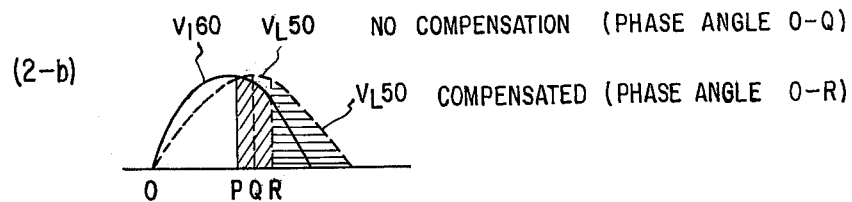
FIGS. 3-a and b are diagrams showing the effects on the output voltage of power supply amplitude variation.
Figure 3:
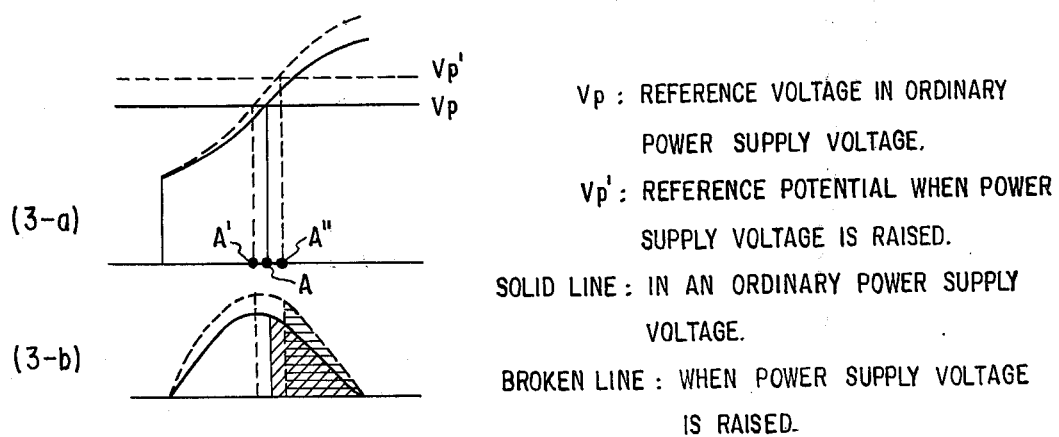
Figure 4:
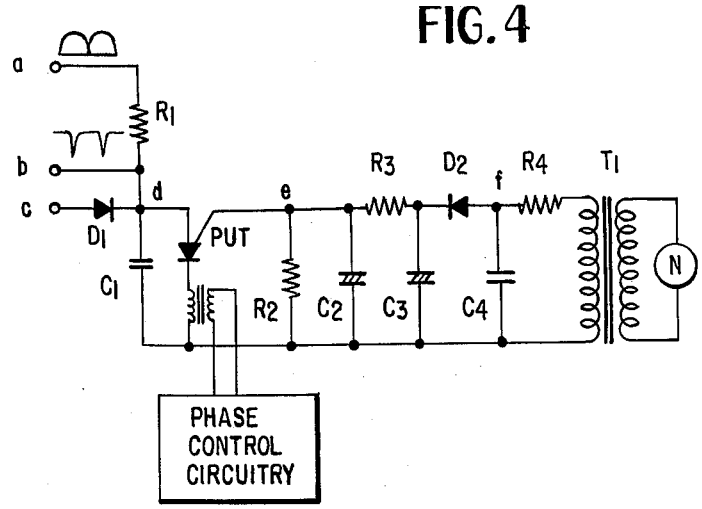
FIG. 4 is a schematic diagram of an illustrative reference point potential compensating circuit according to this invention.

Referring to FIG. 4, the primary side of a transformer $T_1$ is connected to a power supply N and the secondary is connected to a resistance $R_4$ and capacitor $C_4$. The impedance of and voltage across capacitor $C_4$ increases as the frequency changes from 60 to 50 Hz. The capacitor voltage is rectified through a diode $D_2$ and smoothed by a smoothing circuit comprising capacitors $C_2$, $C_3$ and a resistance $R_3$. A detected voltage appears at point e and is a function of the power supply frequency and/or amplitude as can be seen in FIGS. 2 or 3 respectively. This detected voltage corresponds to the voltage $V_p$ or $V_{p'}$ in FIGS. 2 or 3. $V_p$ acts as a gate voltage for a programmable unijunction transistor PUT.

Figure 1:
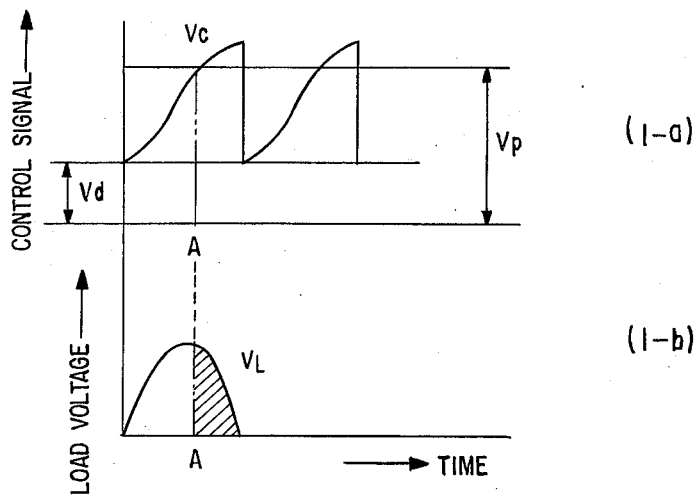
FIGS. 1-a and b show the phase angle and the load wave-form for a control signal where the reference point potential is fixed.

The signal developed at terminal a corresponds to $V_c$ of FIGS. 1–3. $V_c$ may be taken directly or developed from the power supply N and in FIG. 4, the waveform shown at terminal a is derived by full-wave rectifying the output signal from power supply N.

The signal developed at terminal c corresponds to $V_d$ of FIGS. 1–3. $V_d$ is a sensing signal, the amplitude of which varies with changes in the value of the parameter being sensed or measured. Thus, if temperature is the parameter to be sensed and regulated, $V_d$, in the embodiment of FIG. 4, decreases in value as the temperature increases and vice versa. This may be done by inserting a phase inverting amplifier between the sensor and the diode $D_1$. Of course, depending on circuit design, $V_d$ could increase with increasing temperature and decrease with decreasing temperature.

At terminal d, the composite signal, $V_c + V_d$, as shown in FIGS. 1–3 is formed. This composite signal is applied to the anode of unijunction transistor PUT. Transistor PUT fires when the anode voltage, $V_c + V_d$, slightly exceeds the gate voltage, $V_p$, to discharge capacitor $C_1$, through transistor PUT and the pulse transformer in the cathode circuit thereof. Thus a trigger pulse is applied from the secondary of the pulse transformer to the phase control circuit. This pulse, as discussed hereinbefore, may be conventionally used to fire a thyratron-like element which controls the phase angle at which a load voltage $V_L$ is applied to a load. The load may be an electrical device for heating a given area such as a heat fixing station in an electrophotographic copier. The load voltage $V_L$ may be taken directly from power supply N or phase shifted 90° (as in FIGS. 1–3) or otherwise processed for utilization by the phase control circuit.

At terminal b, a series of pulses, as shown, are developed to insure complete discharge of capacitor $C_1$ each time the full-wave rectified voltage, $V_c$, becomes zero. These pulses are derived by differentiating either $V_c$ or the output signal from power supply N.

In operation, assume that the sensed parameter, for example — temperature, increases; $V_d$ will thus decrease. In the arrangement of FIG. 1, where the reference point potential (corresponding to the desired temperature at which a given area, such as the heat fixing station of an electrophotographic copier, should be maintained) is fixed, the point A is shift to the right. Thus, the generation of the trigger pulse by transistor PUT of FIG. 4 is delayed thereby decreasing the ON TIME of the voltage $V_L$. The ON TIME of $V_L$ is denoted by the cross hatched portion of $V_L$ in FIG. 1. The decrease in ON TIME results in a load voltage drop thereby reducing the amount of heat generated at the heat fixing station to reduce the temperature to the before-mentioned desired temperature.

The problems which result if the power supply frequency or amplitude vary have been discussed hereinbefore with respect to the discussion of the prior art.

In accordance with the present invention, when the amplitude of the power supply voltage increases as illustrated in FIG. 3, compensation is provided by varying the amplitude of the reference potential $V_p$. The increased reference potential is denoted as $V_{p'}$. By increasing the reference voltage from $V_p$ to $V_{p'}$, the TURN ON angle moves to $A''$. Therefore, the TURN ON time of the load voltage $V_L$ in FIGS. 3–6 delays. Hence, the increase in the power supply voltage is compensated for by the delay in the TURN ON time of $V_L$.

The above principle also applies to frequency variations of power supply N as illustrated by FIGS. 2a and 2b.

Thus, the presence of fluctuation in the power supply voltage charges capacitor $C_4$, the charging voltage being rectified and smoothed by diode $D_2$ and the smoothing circuit, so that a d-c voltage, $V_p$, proportional to the input variation of the power supply appears at point e.

As will be clear from the foregoing, voltage $V_p$ varies automatically in response to the variation in power supply frequency and/or power supply voltage. Hence, the effective value of the phase-controlled wave form in the phase control circuit will not be affected by the power supply variation. The frequency detecting circuit may be of the R-C type as shown in FIG. 4 or may be any other circuit or element which produces signals, the amplitude of which is a function of the power supply frequency such as an R-L type circuit.

Thus it can now be seen that an improved reference point potential compensating circuit has been provided in accordance with the invention.

What is claimed is:

1. Reference point potential compensating circuitry for controlling phase control circuitry, which regulates the value of a predetermined parameter, said compensating circuitry comprising means for generating a first signal which varies in amplitude periodically with time;

means for generating a second signal, the amplitude of which varies as a function of said predetermined parameter;

means for adding all values of said first and second signals to develop a third signal which is a substantially linear sum of said first and second signals;

means, responsive to said first signal, for generating a fourth signal, the amplitude of which is a function of the frequency of said first signal and which is representative of a desired value of said parameter;

means for comparing said third and fourth signals to generate a fifth signal when said third and fourth signals are substantially equal, said fifth signal being applied to said phase control circuitry so that said phase control circuitry can maintain said parameter at said desired value independent of frequency or amplitude variations of said first signal.

2. Circuitry as in claim 1 where said means for generating a first signal comprises a power supply for generating a sinusoidal signal, the frequency or amplitude of which is subject to variation.

3. Circuitry as in claim 1 where said means for generating said fourth signal comprises an R-C integrating circuit.

4. Circuitry as in claim 1 where said means for generating said fifth signal comprises (1) a unijunction transistor, said third signal being applied to the anode of said transistor and said fourth signal being applied to the gate thereof and (2) a discharge means in circuit with said transistor, said phase control circuitry being connected to the cathode of said transistor so that when said third signal is slightly greater than said fourth signal, said fifth signal is applied as a pulse to initiate the operation of said phase control circuitry.

* * * * *